US012319543B2

(12) United States Patent
Særvoll

(10) Patent No.: US 12,319,543 B2
(45) Date of Patent: Jun. 3, 2025

(54) POINT-LOADED LIFTING FORK FOR LIFTING STANDING FORMWORK

(71) Applicant: Arnfinn Særvoll, Bodø (NO)

(72) Inventor: Arnfinn Særvoll, Bodø (NO)

( * ) Notice: Subject to any disclaimer, the term of this patent is extended or adjusted under 35 U.S.C. 154(b) by 232 days.

(21) Appl. No.: 18/249,721

(22) PCT Filed: Oct. 21, 2021

(86) PCT No.: PCT/NO2021/050217
§ 371 (c)(1),
(2) Date: Apr. 19, 2023

(87) PCT Pub. No.: WO2022/086340
PCT Pub. Date: Apr. 28, 2022

(65) Prior Publication Data
US 2023/0399203 A1 Dec. 14, 2023

(30) Foreign Application Priority Data
Oct. 22, 2020 (NO) .................................... 20201144

(51) Int. Cl.
*B66C 1/22* (2006.01)
*B66C 1/66* (2006.01)

(52) U.S. Cl.
CPC . *B66C 1/22* (2013.01); *B66C 1/66* (2013.01)

(58) Field of Classification Search
CPC .............. B66C 1/22; B66C 1/66; B66C 1/105
(Continued)

(56) References Cited

U.S. PATENT DOCUMENTS 2,514,307 A * 7/1950 Boyd ......................... B66C 1/24
414/908
3,765,961 A * 10/1973 Mar ....................... H10D 99/00
148/DIG. 49
(Continued)

FOREIGN PATENT DOCUMENTS

CN 110668308 A 1/2020
DE 3111634 A1 10/1982
(Continued)

OTHER PUBLICATIONS

International Preliminary Report on Patentability issued for International Patent Application No. PCT/NO2021/050217, dated Apr. 13, 2023 in 8 pages.

(Continued)

*Primary Examiner* — Paul T Chin
(74) *Attorney, Agent, or Firm* — Knobbe, Martens, Olson & Bear, LLP

(57) ABSTRACT

The present invention provides a device for lifting formwork members, the device comprising an elongate horizontal element comprising a first and a second end and at least a first and a second attachment point for attaching a lifting device, wherein horizontal element at its first end comprises a weight element and a vertical element provided in the second end of the horizontal member, wherein the vertical member comprises than the upper and lower ends and projects downwardly from the horizontal member and a hook body provided in the lower end of the vertical member, the hook member projecting a distance from the first end of the horizontal member so that a point of attachment is centered between the first and second attachment points.

9 Claims, 5 Drawing Sheets

(58) Field of Classification Search
USPC .............................................. 294/81.3, 67.21
See application file for complete search history.

(56) References Cited

U.S. PATENT DOCUMENTS

| | | | | | |
|---|---|---|---|---|---|
| 3,955,844 | A * | 5/1976 | de Castella | E04G 21/16 | 294/67.1 |
| 4,017,109 | A * | 4/1977 | Belinsky | B66C 1/105 | 294/67.21 |
| 4,549,759 | A * | 10/1985 | Fowler, Jr. | B66C 1/24 | 294/81.1 |
| 4,648,647 | A * | 3/1987 | Patton | B66C 1/105 | 212/323 |
| 4,784,419 | A * | 11/1988 | Jensen | B66C 1/24 | 294/67.2 |
| 5,688,010 | A * | 11/1997 | Moyer | B66C 1/24 | 294/67.2 |
| 6,578,892 | B2 * | 6/2003 | Tsimmerman | B66C 1/107 | 294/67.5 |
| 10,654,545 | B1 * | 5/2020 | Allen | B66C 1/66 | |
| 2017/0247893 | A1 | 8/2017 | Guichard et al. | | |

FOREIGN PATENT DOCUMENTS

| | | | |
|---|---|---|---|
| DE | 253989 | A1 | 2/1988 |
| DE | 202012003497 | U1 | 6/2012 |
| DE | 102011116985 | A1 | 5/2013 |
| DE | 202019001296 | U1 | 6/2020 |
| EP | 0595470 | A2 | 5/1994 |
| FR | 3006354 | A1 | 12/2014 |
| JP | S54-58776 | U | 4/1979 |
| JP | S60-85574 | U | 6/1985 |
| JP | H07-137980 | A | 5/1995 |
| JP | H11-5685 | A | 1/1999 |
| NO | 321441 | B1 | 5/2006 |
| NO | 337204 | B1 | 2/2016 |
| SE | 415247 | B | 9/1980 |
| SE | 428010 | B | 5/1983 |
| SE | 8802118 | L | 12/1989 |

OTHER PUBLICATIONS

International Search Report issued for International Patent Application No. PCT/NO2021/050217, dated Jan. 13, 2022 in 3 pages.
Norwegian Search Report issued for Norwegian Patent Application No. 20201144, dated May 21, 2021 in 3 pages.

* cited by examiner

POINT-LOADED LIFTING FORK FOR LIFTING STANDING FORMWORK

CROSS-REFERENCE TO RELATED APPLICATIONS

This application is the U.S. National Phase under 35. U.S.C. § 371 of International Application PCT/NO2021/050217, filed Oct. 21, 2021, which claims priority to Norwegian patent application No. 20201144, filed Oct. 22, 2020. The disclosures of the above-described applications are hereby incorporated by reference in their entirety.

FIELD OF THE INVENTION

The present invention relates to a point-loaded lifting fork for lifting standing formwork members.

BACKGROUND

When constructing modern buildings and constructions of concrete or with a concrete foundation, formwork and formwork systems are normally used. Traditional formwork systems in steel are not easy to handle, mainly due to huge weight and inconvenient sizes. For the same reason, all assembly is performed with a crane. Formwork equipment spread over an unnecessarily large area on a construction site is a signal of poor storage routine. Clutter on the construction site makes it difficult to get an overview of equipment, and the first impression of the construction site will then be horrendous.

A disadvantage of crane transport in connection with formwork installation is that the parts are hoisted/transported as small packages, usually with only one size of formwork member at a time. At the construction site, formwork members and plates are often transported over long distances. Carrying formwork in small units with a crane over large distances takes time, and often must be done at the expense of other work. Lack of crane capacity on a construction site can result reduced progress and greater costs. Transport of formwork members constitutes a significant cost, externally, since the formwork is often transported over large distances to and from the construction site, and internally at the construction site, since the formwork equipment is transported in small packages with a crane in connection with intermediate storage, assembly, demolition, car loading etc.

Norwegian patents 321441 and 337204 describe a pallet system for transporting standing formwork members for transporting formwork mounting on pallets and a method for lifting such a pallet via a strap which in turn has two or more attachment points to the standing formwork members. This leads to manual work to attach the strap arrangement to the standing formwork members, and it is demanding to move one formwork member at a time. Attaching a lifting strap to standing members is not a favorable solution due to the large height. Picking up and handing over members in a work cycle will soon constitute a significant working time for a work team. Document CN 110668308 A shows an unbalanced lifting device for lifting formwork shutters which comprises a crossbeam with fastening clamps which is designed as an elongate horizontal element with a first and a second end. A vertical member is located at the other end of the horizontal member and a nut is provided to clamp an object. Document DD 253989 A1 shows a lifting device where a lifting fork is inserted into a recess in formwork members. The lifting fork has two devices, one to be able to lift from one of the long sides of the formwork hatch and one to be able to lift from the upper part of the formwork hatch. Document DE 202019001296 U1 shows designs of walkways that can be connected to formwork shutters and document D2 202012003497 U1 shows railings for walkways to formwork shutters.

Far simpler, a solution according to the present invention will enable a completely new, safer, faster and simpler transport of formwork members from a pallet to the intended location, than with known systems, for instance in that formwork plates can be transported from a standing position on a pallet, and lifted and transported by crane, car and forklift without complicated fastening systems. Standing formwork members can make better use of a storage space, in addition to which standing formwork members can then be made more complete with associated scaffolding floors, scaffolding brackets, frame for corner members. With formwork plates that have scaffolding floors permanently attached to all main plates, a formwork system is achieved with fewer parts and which can then be built and demolished much faster. With one scaffolding floor and two scaffolding brackets per formwork plate, it constitutes a significant saved volume regarding storage, transport and assembly, shrinkage and maintenance.

There is therefore a need for a lifting fork which can be quickly maneuvered to a recessed attachment point of a standing formwork member and certainly a simple and solid attachment to a pallet with standing formwork members. As well as formwork members with a scaffolding floor permanently attached to the framework.

With a point-loaded lifting fork according to the invention described here, however, the above-described disadvantages and limitations are avoided, and that further advantages are obtained with the invention as it is described with the features stated below and in the claims.

SUMMARY

The present invention provides a device for lifting formwork members, the device comprising an elongate horizontal element comprising a first and a second end and at least a first and a second attachment point for attaching a lifting device, wherein horizontal element at its first end comprises a weight element and a vertical element provided in the second end of the horizontal member, wherein the vertical member comprises than the upper and lower ends and projects downwardly from the horizontal member and a hook body provided in the lower end of the vertical member, the hook member projecting a distance from the first end of the horizontal member so that a point of attachment is centered between the first and second attachment points.

In one embodiment of the invention, the lifting device is a strap, a rope, a metal wire or other suitable elongate bodies for lifting which are attached at one end to a device for providing lifting.

In a further embodiment, the device for providing lifting is a hoisting crane, lifting crane, crane truck or winch.

In a further embodiment, lifting device at its lower end against lifting fork is divided into a first and second part and in which the elongate horizontal element comprising a first and second attachment point for attachment to first and second part, respectively, of the lifting device.

In a further embodiment, the weight element is movable and attachable along the length of the horizontal element to change the center of gravity of the lifting fork.

The second aspect of the invention relates to a system for lifting a standing formwork member using a point-loaded lifting fork according to any embodiment of the invention, wherein a standing formwork member comprises a centered vertical profile which is an elongate channel profile or strut, and wherein the vertical profile comprises a recess which is adapted to the attachment point of the lifting fork on the hook body.

In an embodiment of the second aspect, the invention relates to a formwork member which further comprises a scaffolding system, wherein the scaffolding system comprises scaffolding floor mounted on the upper part of the formwork shutter, railing supports attached to a pivotable holder recessed in the vertical profile of the formwork member is pivotable into the legal position.

In a further embodiment of the second aspect, the scaffolding system of the invention further comprises horizontal railing elements attached to at least one railing support.

In a further embodiment of the second aspect, the invention relates to at least one horizontal extension profile incorporated in at least one railing element for adapting the width of the railing.

BRIEF DESCRIPTION OF THE FIGURES

For a better understanding of the invention, a set of figures is included. Equal numbers on different figures describe the same feature.

FIG. 1 shows the main formwork member 1 of the formwork. The main formwork member 1 has locking profiles 2 with strut holes and a recessed formwork member lock at a distance of one module, two modules and one module, respectively, measured from the top. A main formwork member 1 is three modules wide. Vertical beams, such as vertical profile 3 has a one module distance continuously. Scaffolding floor 8 has the same width and length as a main member 1 and is permanently attached to all member sizes. In order to provide easy lifting of a main formwork member 1, a box-shaped vertical profile 4, V-profile, is centered on the flat side of the main formwork member 1 with a channel profile, comprising a recessed opening 5 for insertion of a lifting fork 9.

FIG. 2 shows two main formwork member 1 connected together with a detachable horizontal channel profiles, H-profiles 6, which spans three vertical profiles 3 and a plate member joint 7. The H-profile 6 reduces the number of necessary strut rows in addition to eliminating the use of a centered strut hole row in the main formwork member 1.

FIG. 3 shows the lifting fork 9 for the formwork. The lifting fork 9 consists of an elongate horizontal element 10 fastened to a lifting strap 11 in a first and a second fastening point 12*a*, 12*b*. The lifting strap 11 is divided at its lower end at the lifting fork, into a first and a second end 13*a*, 13*b* for attachment to the first and second attachment points 12*a*, 12*b*, respectively, on the lifting fork 9.

Figure 1:
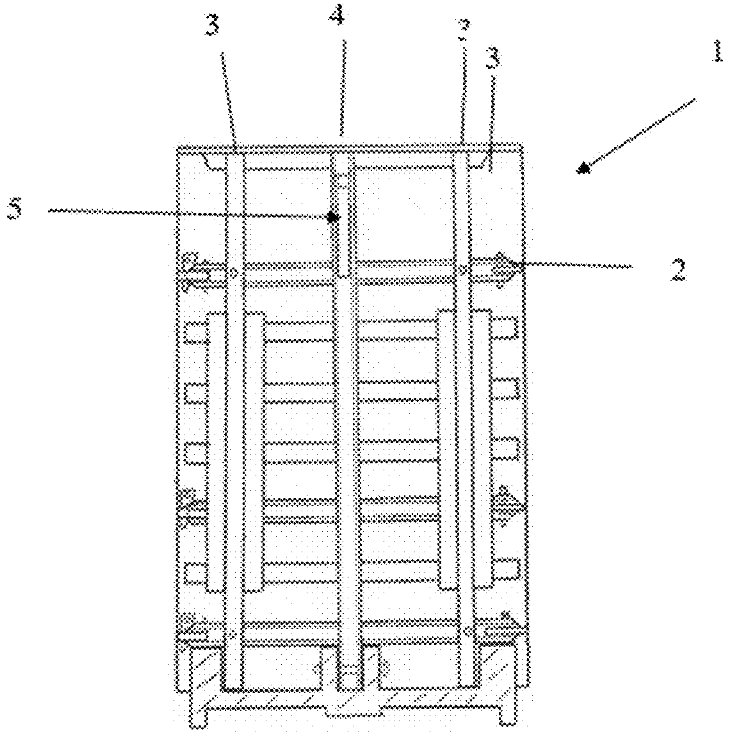
FIG. 1 shows a standing formwork member on a pallet.
Figure 2:
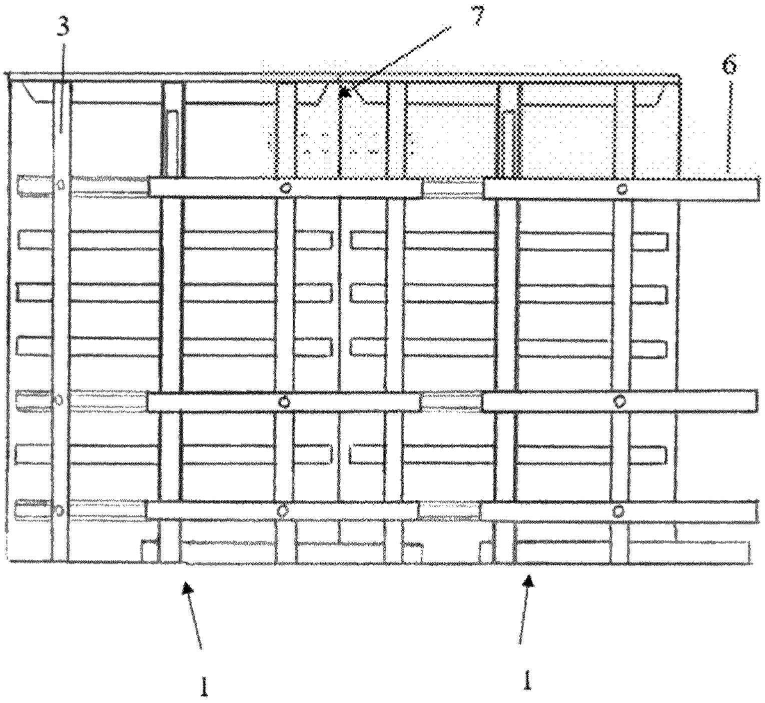
FIG. 2 shows the framework of the formwork member
Figure 3:
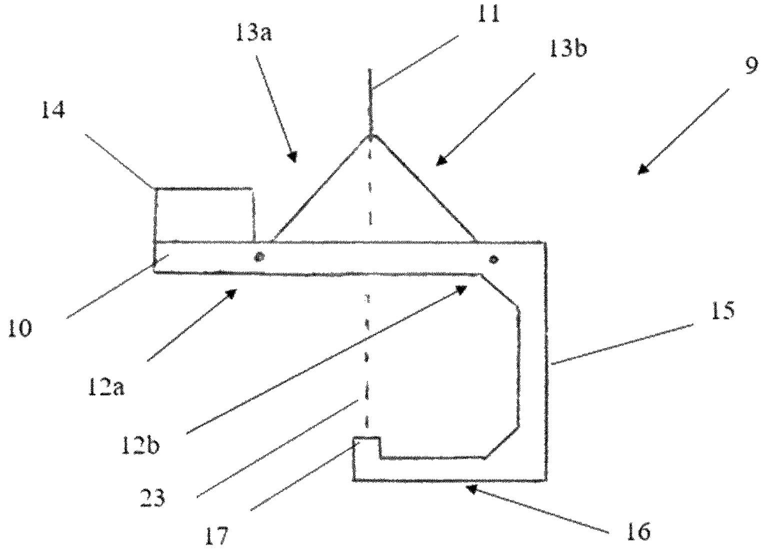
FIG. 3 shows the formwork lifting fork.

The horizontal element 10 comprises a first and a second end, wherein at its first end comprises a weight element 14 and at its other end comprises a vertical element 15 projecting down from horizontal element 10. In the lower end of vertical element, a hook body 16 is provided which projects a distance towards the first end of the horizontal element 10, so that a fastening point 17 on the hook body is on a vertical line 23 with the lifting strap 11 which is centered between the first and second fastening points 12*a*, 12*b*. The lifting strap 11 may be a strap, a rope, a metal wire or other suitable elongate bodies suitable for lifting.

In order for the lifting fork 9 to be balanced approximately level both with and without load i.e. attached formwork member, so that the attachment point 17 is on a vertical line 23 with the lifting strap 11 and the moment from the weight element 14 is equal to the moment formed by the vertical element 15 and the hook body 16. To achieve this, the horizontal distance from the center between the first and second attachment points 12*a*, 12*b* to the center of mass of the weight member 14 multiplied by the weight of the weight member 14 must be equal to the distance from the center between the first and second attachment points 12*a*, 12*b* to the center of mass of the vertical member 15 and the hook body 16 multiplied by the weight of the vertical element 15 and the hook body 16, given that horizontal element 10 is in equilibrium around the lifting strap 11. In one embodiment of the invention, horizontal element 10 is shorter towards the vertical element 15 from the lifting strap line of attack than towards the weight element 14. In such an embodiment, the remaining elements must compensate for decreasing torque from one side. In this way, the lifting fork 9 will always be in the correct position.

A standing main formwork member standing on a pallet with other main formwork members will be hooked by the attachment point 17 of the hook body 16 in the recess 5 of the main member so that any weight becomes a point load acting in the same vertical line 23 as the lifting strap.

Figure 4:
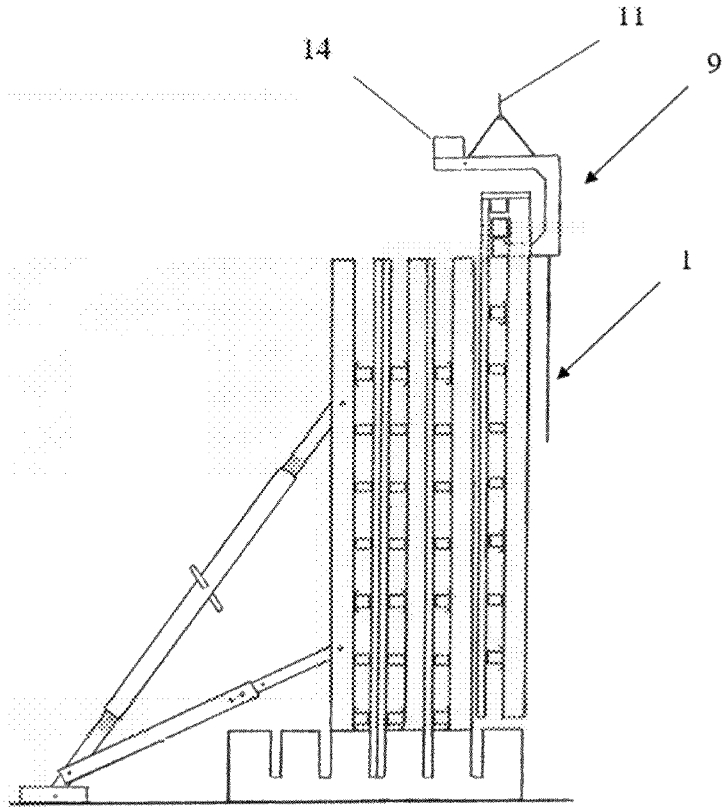
FIG. 4 shows a standing formwork member being lifted from a pallet in a vertical position.

FIG. 4 shows a pallet with standing main formwork members 1 seen from the side. Hanging main formwork member 1 is hoisted in a vertical position with the point-loaded lifting fork 9 in the center of gravity of the hatch 1 which is on the back of the vertical profile 4. With a channel-shaped vertical profile 4 and a cord or strap 11 attached to the lifting fork 9, a member can then soon be loaded and unloaded with a lifting fork 9. The use of a lifting fork 9 is a prerequisite for the formwork members to have fixed scaffolding floors 8.

A point-loaded lifting fork 9 in relation to conventional rope suspension in connection with loading and assembly of hanging formwork members will ensure that a hanging formwork member is kept in the right position even if the weight distribution of the formwork member is changed with attached loose parts. The attachment point 17 of the hook body is fixed in a recess 5 in the centered vertical profile 4 of the main formwork member 1, which is a channel profile which will simplify hanging and attaching another member to the lifting fork.

Figure 5:
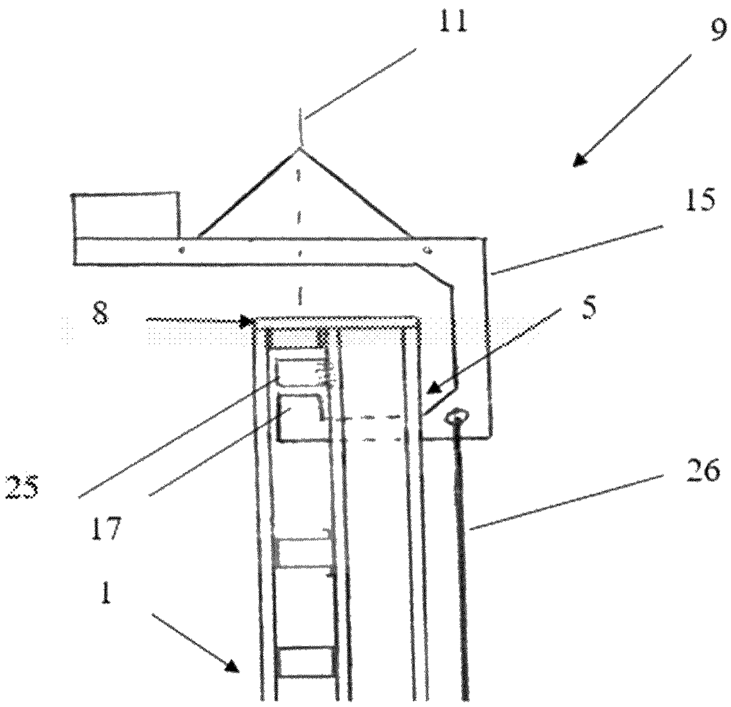
FIG. 5 shows the lifting fork attached to a formwork member

FIG. 5 shows the lifting fork 9 attached to a formwork member of the main formwork member 1 type, where the hook body 16 of the lifting fork 9 passes through the recess 5. A retaining body 25 is attached to the vertical profile 4 and is adapted to receive the attachment point 17 in that the retaining body 25 and the attachment point 17 comprise corresponding contact surfaces when merged. Said corresponding contact surfaces are connected to each other by lifting in a manner which creates a bond, for instance in that the fastening point 17 comprises a positively shaped surface and the retaining body 25 comprises a surface with a negative shape of fastening point at 17 surface. In one embodiment, the lifting fork 9 comprises a guide strap 26 provided on the lifting fork 9 through a fastening point arranged on the vertical element 15. With the guide strap 26 the rotation of the lifting fork 9 about the vertical line 23 from the ground is controlled and is an important tool for quick steering and retrieval of the formwork members standing on a pallet. The guide strap 26 comprises a free end, at the opposite end from where it is attached to the lifting fork 9, which a user can use to manipulate the position of the lifting fork 9 from the ground.

Figure 6:
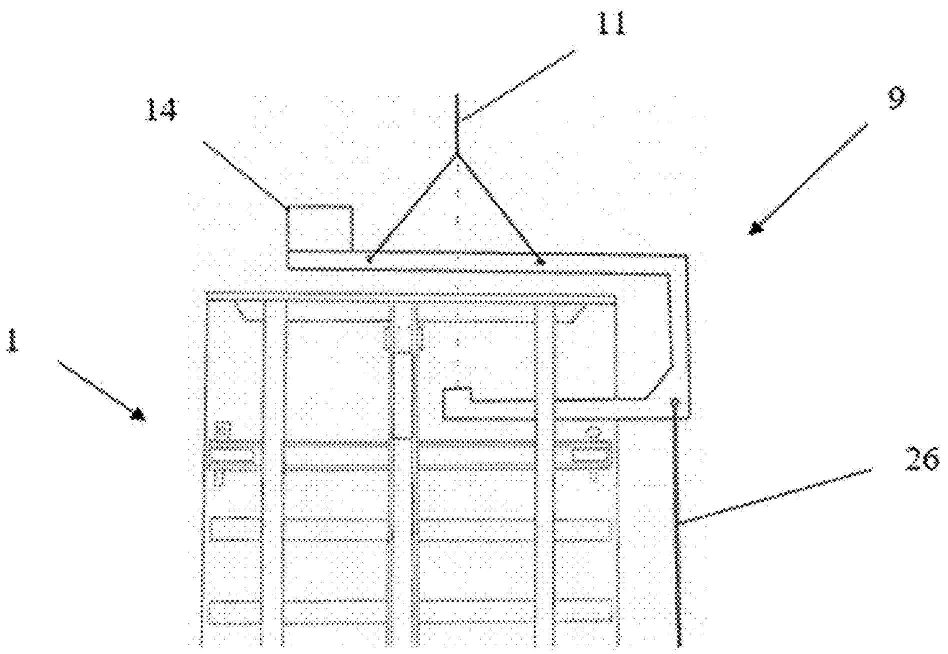
FIG. 6 shows the lifting fork inserted from the side into a formwork member

FIG. 6 shows a main framework member 1 where the lifting fork 9 is inserted from the side of the main framework member 1. Such an application to the lifting fork 9 is advantageous, for example when a damaged formwork member 1, that is situated between two or more formwork members on a pallet with standing formwork members, is to be removed or inserted.

Figure 7:
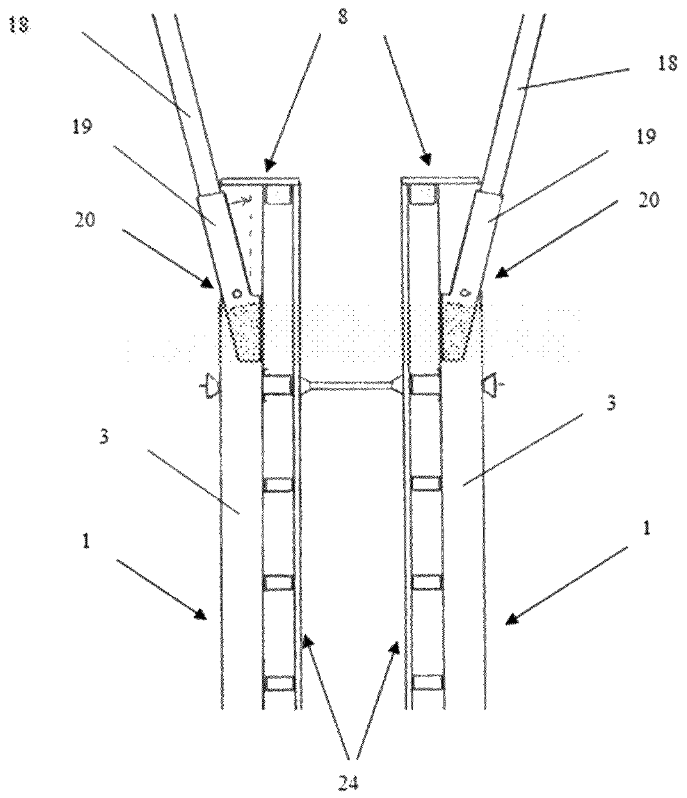
FIG. 7 shows a section of formwork with a two-part scaffolding floor on top formwork.

In order for a lifting fork 9 as described here to be able to be used on a formwork members with scaffolding, it is advantageous that a formwork member with a fixed scaffold floor 8 is provided. FIG. 7 shows a section of formwork with a two-part scaffolding floor 8, i.e. that two opposite formwork members 1 have had their scaffolding floor 8 mounted on their top part with fixed fastening means. Scaffolding floor 8 is adapted to the width and thickness of a formwork member and is permanently attached to all main formwork members 1. Handrail supports 18 are attached to a pivotable holder 19 recessed in the vertical profile 3 adapted to receive a handrail support 18. The pivotable holder 19 is rotatable about an attachment point 20 so that the holder 19 pivots into the upright position when not in use, so that the holder 19 does not protrude beyond the edge of the scaffolding floor 8. The attachment point 20 may be a throughgoing supported bolt, either on one or two sides through a hole in the holder 19. On the inside of the formwork member, one of the formwork plates 24 is illustrated. Formwork with two-part scaffolding 8 enables a good working position for an operator who then stands directly above the mold. Such a two-part formwork prevents the framework from being contaminated with concrete and contributes to a more comfortable working position for receiving concrete.

Figure 8:
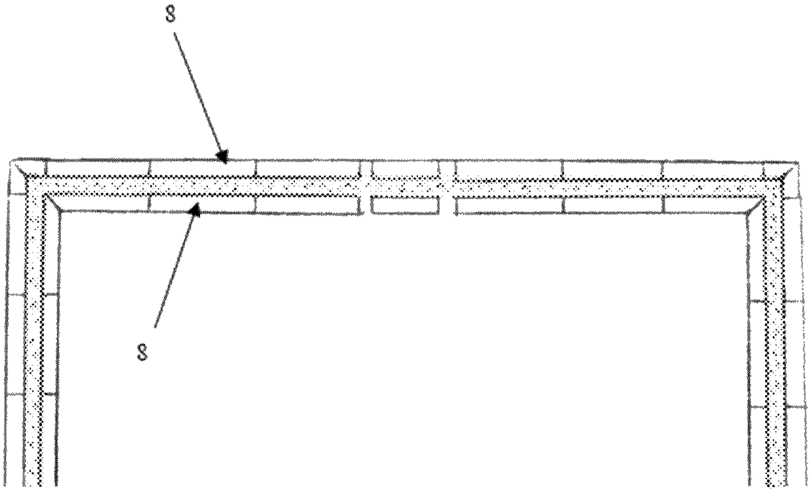
FIG. 8 shows a formwork with a two-part scaffolding seen from above.

FIG. 8 shows a formwork system with a two-part scaffolding floor 8 seen from above. With a two-part scaffolding floor from one corner to another corner on the inside, passage from one wall length to another is simplified (without cost/extra equipment) except that this scaffolding then has an entrance without a railing in each corner.

Figure 9:
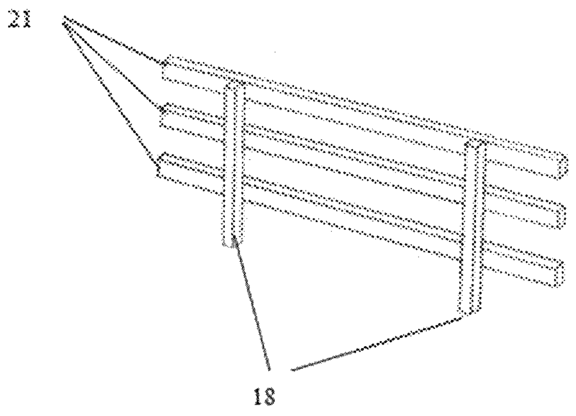
FIG. 9 shows a three-module railing with two supports at a distance of two modules.
Figure 10:
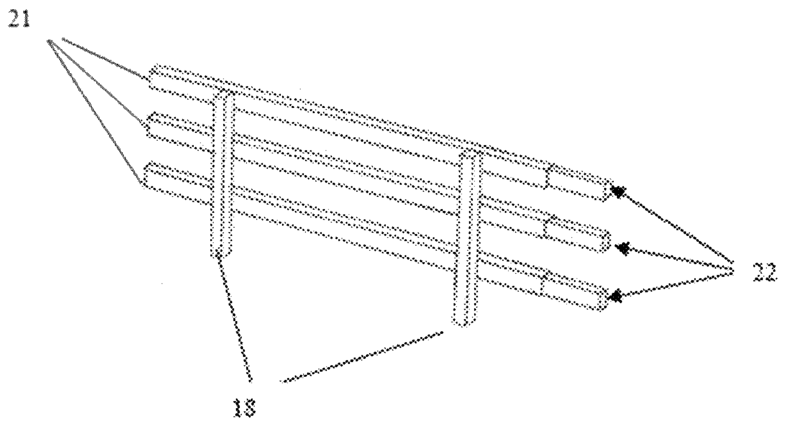
FIG. 10 shows a three-module railing.

FIG. 9 shows three modules where railing elements 21 are attached to two railing supports 18 at a distance of two modules. FIG. 10 shows a three-module long railing with railing elements 21 each with pull-out profiles 22 for adapting railings of obsolete member sizes.

A system as described herein will enable a very simple railing by, among other things, holder 19 for support 18, is recessed in the formwork's vertical profile 3. Such a formwork with built-in scaffolding and railing allows an operator to have one foot on both wall sides while filling in the mold provided by the formwork. Such an invention also enables a formwork system without loose scaffolding brackets and loose scaffolding floors, and which takes up less space and is far easier to move and build than ordinary known solutions. Scaffolding floors without brackets simplify both storage and handling of all formwork material.

Although specific embodiments of the invention have been described and illustrated herein, it is known that modifications and variations may readily occur to those skilled in the art, and consequently the claims are intended to be construed to cover such modifications and equivalents.

REFERENCE NUMBERS

1 Main formwork member
2 Locking profiles
3 Vertical profile, V-Profile, vertically positioned beam, channel profile
4 Box-shaped vertical profile
5 Recess for lifting fork in box-shaped vertical profile
6 Horizontal profile, H-profile, detachable horizontal channel profile,
7 Plate member joint, joint between two formwork plates
8 Scaffolding floor
9 Lifting fork
10 Elongated horizontal body
11 Lifting strap
12*a*, 12*b* First and second attachment point on the horizontal body
13*a*, 13*b* First and second end part of the lifting strap
14 Weight element
15 Vertical element
16 Hook part
17 Attachment point of hook part
18 Railing support
19 Railing holder
20 Rotation point, fastener
21 Railing element
22 Pull-out profiles
23 Vertical line
24 Formwork plate
25 Retaining body
26 Guide strap

What is claimed is:

1. A point-loaded lifting fork for lifting formwork members, comprising;

an elongate horizontal element comprising a first and a second end, and at least a first and a second fastening point for fastening a lifting device, wherein the horizontal element comprises at its first end a weight element, and;

a vertical element provided on the second end of the horizontal element, wherein the vertical element comprises an upper and lower end and projects downwards from the horizontal element, and;

a hook body provided in the lower end of the vertical element, wherein the hook element projects a distance from the first end of the horizontal element so that a fastening point on the hook body is on a vertical line with the lifting device centered between the first and second attachment points.

2. The point-loaded lifting fork according to claim 1, wherein the lifting device is a strap, a rope, a metal wire or other suitable elongate bodies for lifting which are attached at one end to a device for providing lifting.

3. The point-loaded lifting fork according to claim 2, wherein the device for providing lifting is a hoisting crane, lifting crane, crane truck or winch.

4. The point-loaded lifting fork according to claim 1, wherein the lifting device is at its lower end, towards the lifting fork, divided into a first and second part, and wherein the elongate horizontal element comprising a first and second fastening point for attachment to the first and second parts, respectively, of lifting device.

5. The point-loaded lifting fork according to claim 1, wherein the weight element is movable and fastenable along the length of the horizontal element in order to change the center of gravity of the lifting fork.

6. A system for lifting a standing formwork member using the point-loaded lifting fork according to claim 1, wherein the standing formwork member comprises a centered vertical profile, which is a channel profile, and wherein the channel profile comprises a recess which is adapted to the attachment point of the lifting fork on the hook body.

7. The system according to claim 6, wherein the formwork member further comprises a scaffolding system, the scaffolding system comprising:

scaffolding floor mounted on the upper part of the formwork member;

railing supports attached to a pivotable holder recessed in the vertical profile, which is a vertically positioned beam, on the formwork member, the pivotable holder is rotated about a rotation point so that the holder is pivotable into an upright position.

8. The system according to claim 7, wherein the scaffolding system further comprises horizontal railing elements attached to at least one railing support.

9. The system according to claim 8, wherein the scaffolding system further comprises at least one horizontal pull-out profile incorporated in at least one railing element for adjusting the width of the railing.

* * * * *